(12) United States Patent
Forlenza et al.

(10) Patent No.: US 6,778,385 B2
(45) Date of Patent: Aug. 17, 2004

(54) PORTABLE COMPUTER WITH REMOVABLE BOTTOM COMPONENT HOUSING

(75) Inventors: Daniel V. Forlenza, Cypress, TX (US); Jitender K. Kanjiram, Nashua, NH (US); Robert C. Frame, Westboro, MA (US); Michele Bovio, Boston, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/127,960

(22) Filed: Apr. 23, 2002

(65) Prior Publication Data

US 2002/0114131 A1 Aug. 22, 2002

Related U.S. Application Data

(63) Continuation of application No. 09/294,233, filed on Apr. 19, 1999, now Pat. No. 6,392,880.

(51) Int. Cl.$^7$ ................................................ G06F 1/16
(52) U.S. Cl. ..................... 361/686; 361/685; 312/323.1; 439/928.1
(58) Field of Search ......................... 312/223.1–223.6; 439/928, 928.1; 361/680, 681, 683, 685, 686

(56) References Cited

U.S. PATENT DOCUMENTS 4,742,478 A * 5/1988 Nigro, Jr. et al. ........... 364/708
5,175,671 A * 12/1992 Sasaki ......................... 361/686
5,592,362 A   1/1997 Ohgami et al. .............. 361/686
6,088,620 A * 7/2000 Ninomiya et al. ............ 700/16
6,115,246 A * 9/2000 Ohnishi ....................... 361/686
6,151,218 A * 11/2000 Pirdy et al. ................. 361/727
6,392,880 B1 * 5/2002 Forlenza et al. ............ 361/686

OTHER PUBLICATIONS

US 6,335,860, 1/2002, Shin et al. (withdrawn)*

Fujitsu "Lifebook L Series" Brochure Sheet (Fall/Winter 1998).

Fujitsu "Notebook Accessories" Brochure (Fall/Winter 1998).

* cited by examiner

Primary Examiner—Hung Van Duong

(57) ABSTRACT

A portable computer has pivotally connected base and display screen lid housings and is provided with a generally wedge-shaped auxiliary component housing which is releasably latchable to the bottom of the base housing and extends across only a rear underside portion of the base housing. The attached auxiliary housing representatively carries a CD/DVD media drive unit and a floppy disk drive unit, operatively couples them to various computer components in the base housing, and is configured to rearwardly and upwardly tilt he base housing keyboard at a predetermined comfortable typing angle when the base housing is placed atop a horizontal work surface such as a desktop.

18 Claims, 3 Drawing Sheets

PORTABLE COMPUTER WITH REMOVABLE BOTTOM COMPONENT HOUSING

This application is a continuation of Ser. No. 09/294,233 Apr. 19, 1999, now U.S. Pat. No. 6,392,880

BACKGROUND OF THE INVENTION

1. Field of the Invention

The present invention generally relates to electronic apparatus and, in a preferred embodiment thereof, more particularly relates to a portable notebook computer having removably secured to the bottom side of its base housing a specially configured auxiliary component housing.

2. Description of Related Art

Modern portable notebook computers are typically provided with a media storage device such as a floppy disk drive and/or a multimedia device such as a CD-ROM/DVD device. These media devices may be carried within the base housing portion of the notebook computer or be a separate portion of the overall portable computer system which must be externally connected to the base housing. In this case, the basic computer has a considerably smaller spatial envelope, and tends to be substantially lighter and more portable, due to a corresponding reduction in the required size of its base housing.

One conventional method of providing the computer with external media device capability is to simply provide, for example, an external floppy drive device which has a cable that may be releasably plugged into the computer base housing, with the externally floppy drive device sitting off to one side of the base housing on a work surface such as a desktop area. This method of selectively augmenting the functionality of a notebook computer tends to be rather cumbersome, and undesirably requires additional desktop work space.

Another previously proposed and somewhat more desirable technique for providing for the external connection to a notebook computer base housing of auxiliary computer components such as media devices has been to package such components in an additional rectangular housing which releasably attaches to the underside of the base housing and occupies its entire vertical footprint, thereby substantially increasing the height of the overall notebook computer base structure along the entire underside area of the base housing portion of the computer.

While this approach requires less workspace area when the computer (with the auxiliary housing operatively attached to the underside of its base housing) is placed atop, for example, a desktop, it presents various problems, limitations and disadvantages of its own. For example, as mentioned above, the entire height of the notebook computer is increased, thereby undesirably making the previously slim computer appear considerably thicker—a characteristic which may trigger buyer resistance in an era where notebook computers are increasingly being packaged in thinner and thinner packages.

Additionally, when the computer is placed on a horizontal work surface a conventionally configured additional housing attached to the underside of the computer base housing raises the computer keyboard to a potentially uncomfortable typing height while maintaining the elevated keyboard in a parallel relationship with the underlying desktop work surface. If the user prefers an upwardly and rearwardly sloping keyboard orientation, suitable support feet must be added to the overall computer apparatus to accommodate this user preference.

From the foregoing it can be readily seen that a need exists for an improved structure for packaging auxiliary components which may be removably attached to the underside of a portable computer base housing. It is to this need that the present invention is directed.

SUMMARY OF THE INVENTION

In carrying out principles of the present invention, in accordance with a preferred embodiment thereof, electronic apparatus is provided which is representatively in the form of a portable notebook computer having a base housing to which a display screen is pivotally secured. The base housing has a plurality of electronic components operatively disposed in its interior, and the apparatus further comprises an auxiliary housing having top and bottom sides and an interior in which at least one auxiliary component is operatively disposed. Illustratively, a media storage device, representatively a floppy disk drive, and a multimedia drive unit, representatively a CD ROM/DVD drive unit, are operatively disposed within the auxiliary housing.

The auxiliary housing is operatively securable to the bottom side of the base housing and is configured and positioned on the bottom base housing side in a manner such that when the base housing is placed atop a horizontal support surface the auxiliary housing causes the base housing (and thus the keyboard thereon) to be rearwardly and upwardly sloped relative to the support surface at a predetermined tilt angle which is representatively within the range of from about 8.5 degrees to about 9.5 degrees, and is preferably about 8.8 degrees.

According to features of the invention, the auxiliary housing has a generally wedge-shaped exterior spatial envelope, and extends along only a rear portion of the bottom side of the base housing when operatively attached thereto.

In the illustrated preferred embodiment of the electronic apparatus, the base and auxiliary housings have cooperatively interengageable electrical connectors thereon which, when interengaged, electrically couple the base and auxiliary housing components. The base and auxiliary housings also have cooperatively engageable latch structures which function, in response to placement of the auxiliary housing against the underside of the base housing, to automatically and releasably latch the auxiliary housing to the base housing. The auxiliary housing is preferably configured to be inset from opposite left and right ends of the base housing to reduce, from a visual aesthetic standpoint, the noticeable thickening of the base portion of the computer caused by the attachment thereto of the auxiliary component housing. To further expand the functionality of the electronic apparatus, a docking station electrical connector is disposed on the underside of the auxiliary housing to permit the computer to be placed atop and electrically coupled to an underlying computer docking station.

DETAILED DESCRIPTION

Figure 1:
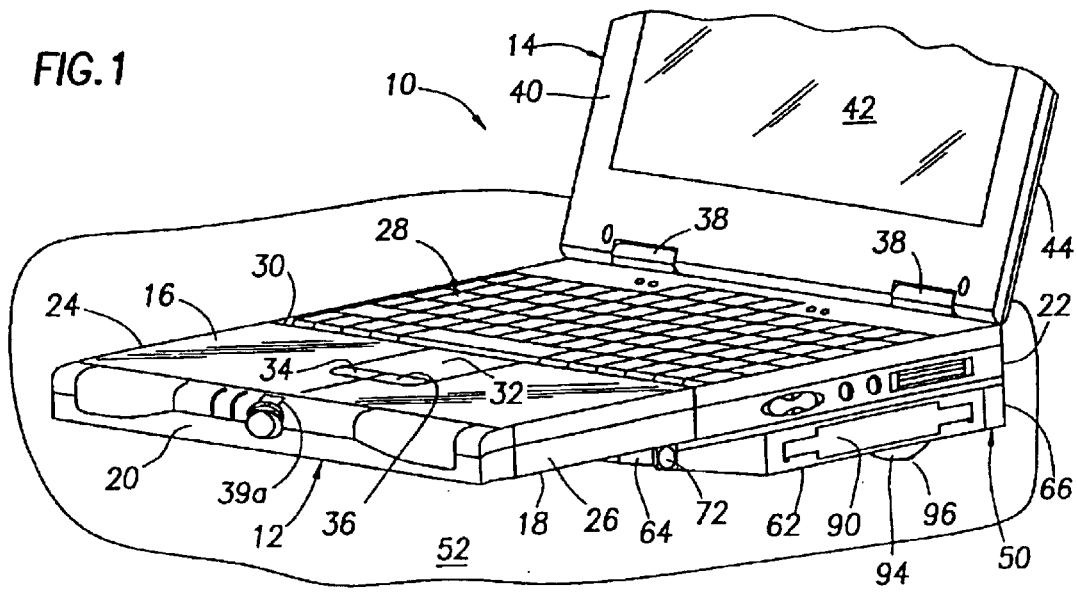
FIG. 1 is a perspective view of a portable notebook computer having a specially designed, generally wedge-shaped auxiliary component housing removably secured to the bottom side of the computer base housing and embodying principles of the present invention.
Figure 2:
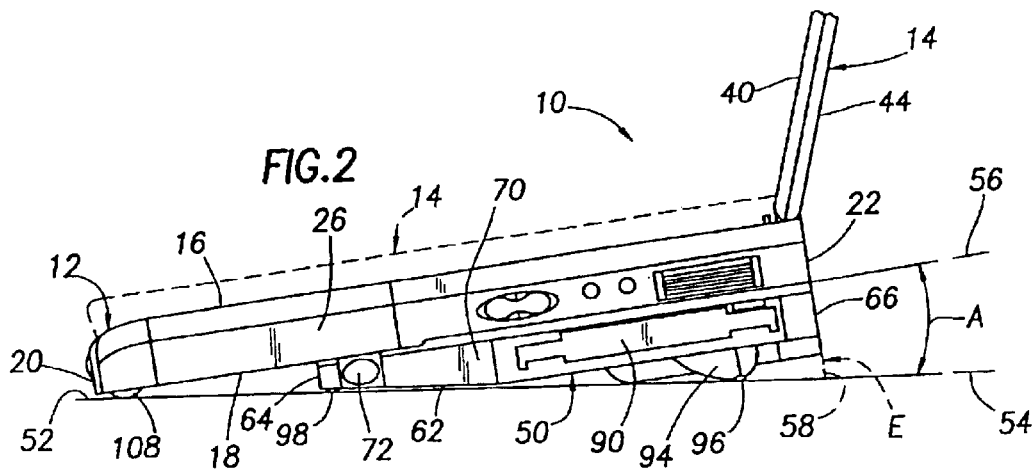
FIG. 2 is an enlarged scale right end elevational view of the computer.
Figure 3:
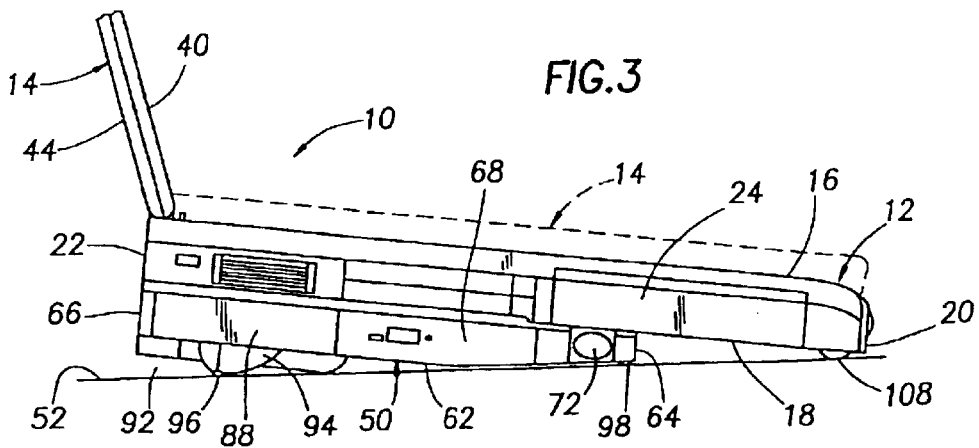
FIG. 3 is an enlarged scale left end elevational view of the computer.

Illustrated in FIGS. 1–3 is an electronic apparatus, representatively a portable notebook computer 10 embodying principles of the present invention. Computer 10 has a relatively thin rectangular base housing 12 and a thinner rectangular display lid housing 14. Base housing 12 has a horizontal top side wall 16, a bottom horizontal side wall 18 extending parallel to the top side wall 16, front and rear vertical side walls 20 and 22, and left and right vertical end walls 24 and 26. A keyboard 28 is operatively mounted on a rear portion of the top side wall 16, within a suitable opening 30 therein, and is positioned rearwardly of a touchpad pointing device 32 and associated selector buttons 34,36. Operatively disposed within the base housing 12 are various electronic components (not shown) such as a motherboard, a microprocessor, memory modules, a hard drive and the like.

Lid housing 14 is secured to a top rear corner portion of the base housing 12 by a hinge structure 38 for pivotal movement relative to the base housing 12 between a generally vertically oriented solid line open use orientation and a generally horizontal closed storage and transport orientation (shown in dashed lines in FIGS. 2 and 3) in which the lid housing 14 extends across the top side wall 16 of the base housing 12 and covers the keyboard 28. A latch member 39 (see FIG. 5) on the top edge of the lid housing 14 is receivable in a corresponding opening 39a (see FIG. 1) in the base housing 12 to releasably hold the lid housing 14 in its dashed line closed position. Lid housing 14, in its opened orientation, has a front side 40 with a display screen 42 thereon, and a rear side 44.

According to a key aspect of the present invention, the computer 10 also includes a specially configured auxiliary component housing 50 which is releasably attachable to the bottom side 18 of the base housing 12 and is utilized to support additional computer components and electrically couple them to various ones of the components disposed within the base housing 12. With the computer 10 in its opened use orientation, the auxiliary component housing 50 in place on the bottom side 18 of the base housing 12, and the computer 10 placed on a horizontal work surface such as the illustrated desktop 52, the auxiliary component housing 50 is interposed between a rear portion of the bottom side 18 of the base housing 12 and the desktop 52 and automatically causes the base housing 12 to be upwardly and rearwardly tilted relative to the desktop 52 at a comfortable, relatively small typing angle A (see FIG. 2) which is representatively within the range of from about 8.5 degrees to about 9.5 degrees, and is preferably approximately 8.8 degrees.

According to an aspect of the present invention, this desirable tilting of the base housing 12 (and thus the keyboard 28) is preferably facilitated by configuring the auxiliary component housing 50 so that it is disposed within a generally wedge-shaped exterior spatial envelope E (see FIG. 2) having a bottom plane 54, a top plane 56 upwardly and rearwardly sloped at the angle A relative to the bottom plane 54, and a rear end plane 58 generally transverse to the plane 56. With the computer 10 resting atop the desktop 52 as shown in FIGS. 1–3, the bottom plane 54 is substantially coincident with the top side of the desktop 52, the top plane 56 is substantially coincident with the bottom side 18 of the base housing 12, and the rear end plane 58 is substantially coincident with the rear side 22 of the base housing 12.

Figure 6:
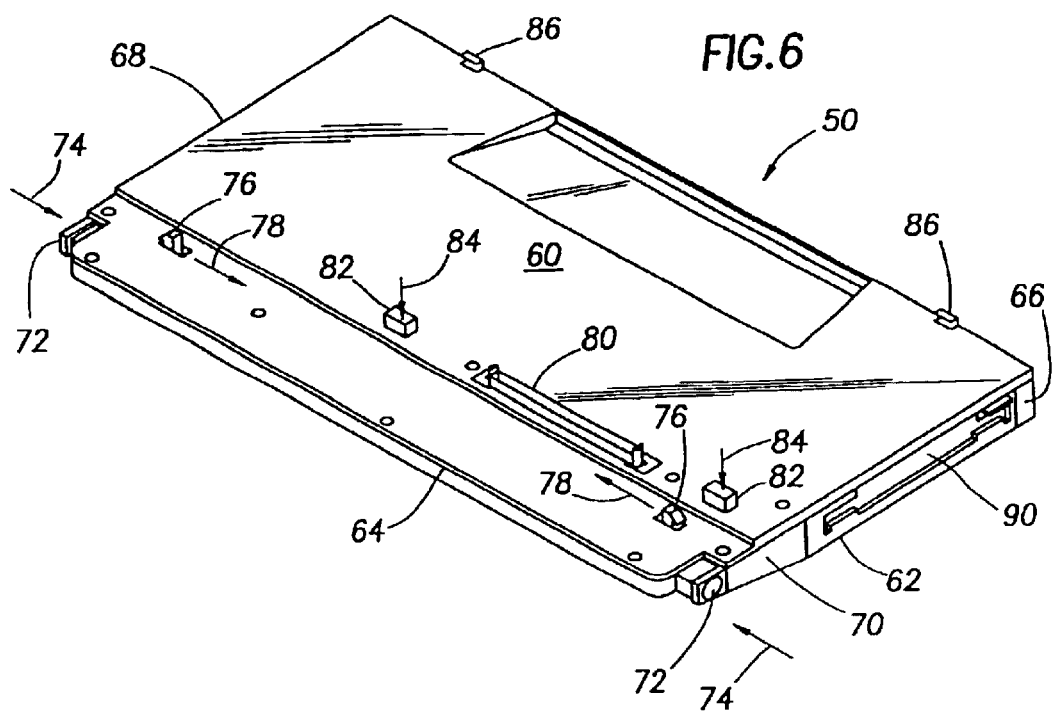
FIG. 6 is an enlarged scale top side perspective view of the auxiliary component housing removed from the computer base housing.
Figure 7:
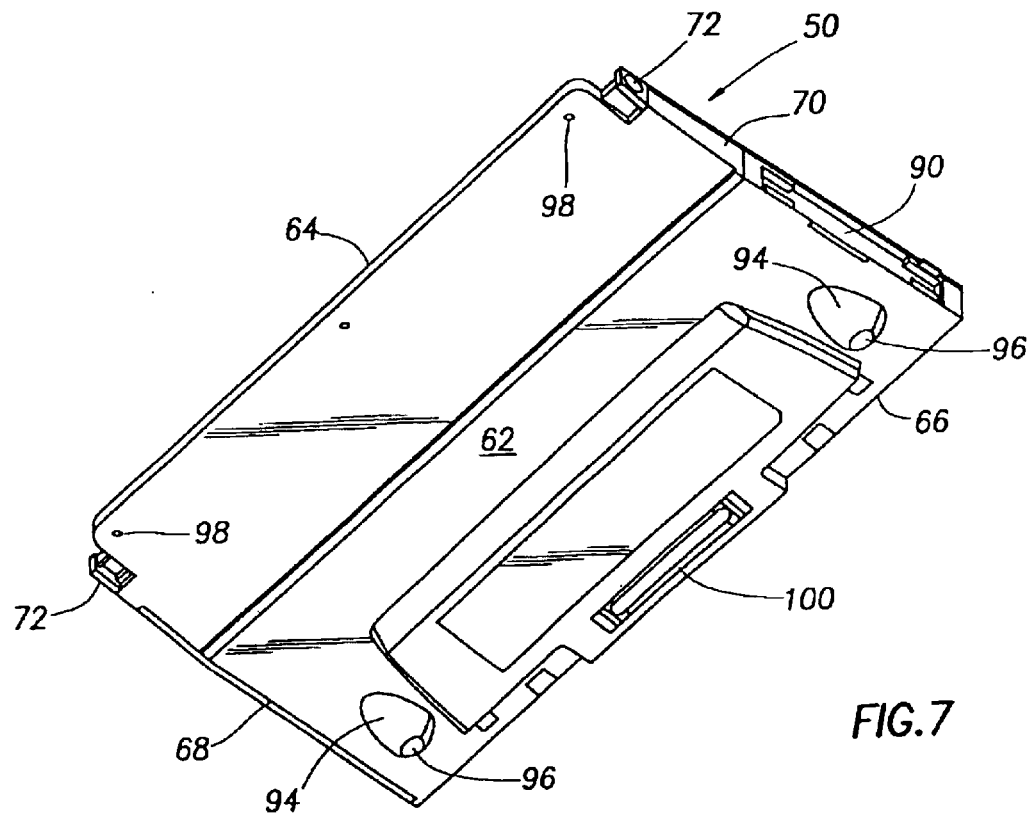
FIG. 7 is an enlarged scale bottom side perspective view of the auxiliary component housing removed from the computer base housing.

As best illustrated in FIGS. 6 and 7, the generally wedge-shaped auxiliary component housing 50 has opposite top and bottom sides 60 and 62, a relatively small maximum vertical thickness, and a generally rectangular configuration as viewed from either of its top and bottom sides 60 and 62. Housing 50 also has opposite front and rear side edges 64 and 66, and opposite left and right end edges 68 and 70. A pair of release buttons 72 positioned on opposite front corner portions of the housing 50 are operative, in response to be pushed in as indicated by the arrows 74 in FIG. 6, to inwardly shift a pair of spring-loaded latch members 76 projecting upwardly from the top side 60 of housing 50, as indicated by the arrows 78 in FIG. 6.

Positioned somewhat rearwardly of the latch members 76 on the top side 60 of the auxiliary component housing 50 is an upwardly projecting male electrical connector 80 positioned between a pair of generally rectangularly configured upwardly projecting lug members 82. Lug members 82 are spring-biased to their upwardly projecting positions shown in FIG. 6, but are resiliently depressible into the interior of the housing 50 as indicated by the arrows 84 in FIG. 6. For purposes later described herein, a spaced pair of upstanding latch hook members 86 are suitably anchored to a rear top corner portion of the auxiliary component housing 50 as may be best seen in FIG. 6.

Although other types of computer components could be operatively carried by the housing 50, it is utilized in the illustrated preferred embodiment of the present invention as a media device housing, and representatively supports within a left end portion thereof a multimedia drive unit in the form of a CD/DVD unit 88, and within a right end portion thereof a media storage unit in the form of a floppy disk drive 90 (or, alternatively, an LS 120 drive unit). The media units 88,90 are electrically coupled in a suitable manner to the connector 80 on the top side of the auxiliary component housing 50.

As illustrated in FIG. 3, a cutout area 92 is suitably formed on a rear underside portion of the auxiliary component housing 50 to provide a rear portion thereof (as viewed from either of the housing ends 68,70) with a generally rectangular configuration, and a front portion thereof with a truncated wedge-shaped configurations. The media units 88,90 are disposed in these generally rectangular rear portions of the housing 50.

Turning now to FIG. 7 a pair of support leg structures 94, having resilient lower end portions 96, depend from rear corned portions of the bottom side 62 of the auxiliary component housing 50, and two small resilient support projections 98 are suitably secured to and project downwardly from a front bottom edge portion of the housing 50. Centrally disposed on a rear bottom portion of the housing 50 is a docking station connector 100.

Figure 4:
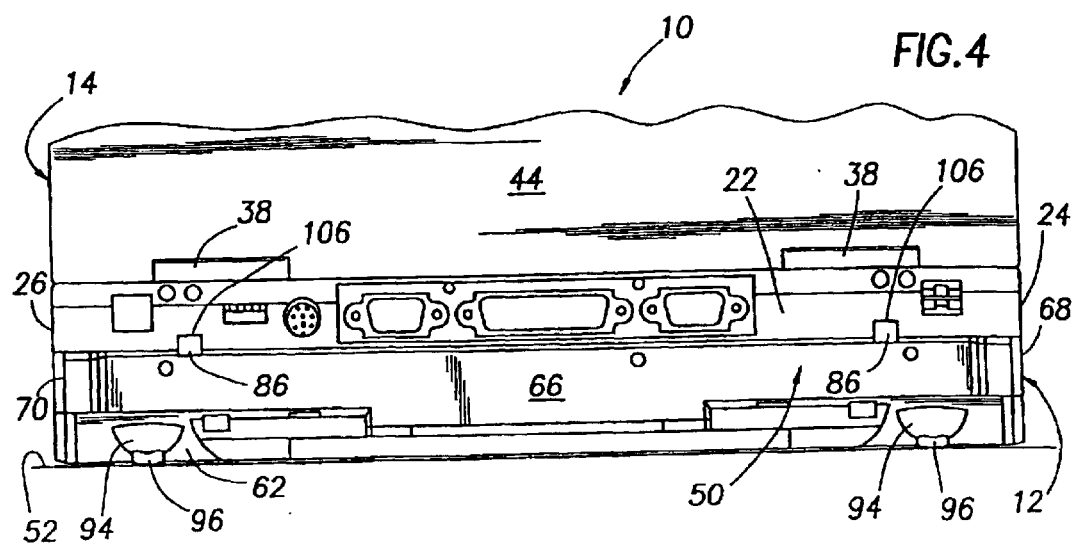
FIG. 4 is an enlarged scale rear side elevational view of the computer.
Figure 5:
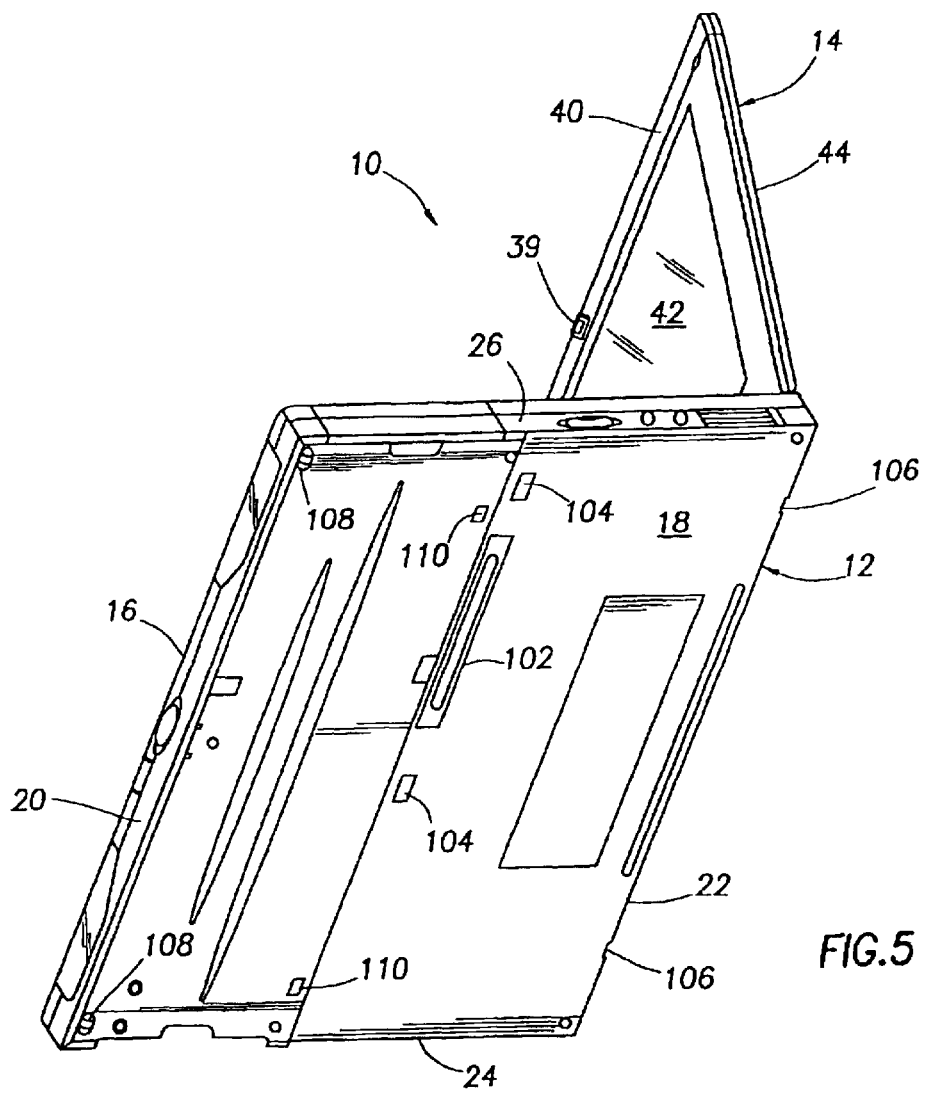
FIG. 5 is a bottom side perspective view of the computer with the auxiliary component housing removed from the underside of its base housing.

As best illustrated in FIG. 5, a female electrical connector 102 is positioned on the bottom side 18 of the computer base housing 12, and is positioned between two rectangular indentations 104 formed in the bottom base housing side 18. Connector 102 is operatively connected to the various previously mentioned computer components disposed within the base housing 12. On a top edge portion of the rear side 22 of the base housing 12, as indicated in FIGS. 4 and 5, are two spaced apart slots 106. Small resilient support projections 108 (see FIG. 5) are suitably disposed on front corner portions of the bottom side 18 of the base housing 12.

The generally wedge-shaped auxiliary component housing 50 is removably attached to a rear underside portion of the computer base housing 12 by placing the housing 50 on the desktop 52, tilting the base housing upwardly and forwardly, hooking the component housing rear side edge latch members 86 into the base housing rear side slots 106 (see FIG. 4), and then pivoting the base housing 12 downwardly against the underlying auxiliary housing 50.

As the bottom side 18 of the base housing 12 is brought into abutment with the top side 60 of the auxiliary housing 50, the spring-loaded lug members 82 on the top side 60 of the housing 50 (see FIG. 6) enter the overlying indentations 104 on the bottom side 18 of the base housing 12 (see FIG. 5) to thereby facilitate the alignment of the auxiliary and base housing connectors 80 and 102, the connectors 80,102 are releasably mated, the lug members 82 are resiliently depressed, and the spring-loaded latch members 76 on the top side of the auxiliary housing 50 (see FIG. 6) are deflected and snap into corresponding openings 110 in the bottom side 18 of the base housing 12 (see FIG. 5). This releasably latches the auxiliary component housing 50 on a rear underside portion of the base housing 12, and electrically couples the media units 88,90 in the housing 50 with the various electronic components within the base housing 12 via the releasably mated auxiliary and base housing connectors 80,102.

To remove the auxiliary housing 50 from the underside of the base housing 12, the release buttons 72 are simply pushed, as indicated by the arrows 74 in FIG. 6, to unhook the latch members 76 from the base housing 12, as indicated by the arrows 78 in FIG. 6. This unlatching permits the resiliently depressed lug members 82 to forcibly uncouple the mated connectors 80,102 and downwardly pivot the auxiliary housing 50 away from the underside of the base housing 12 and permit the removal of the auxiliary housing latch hook members 86 from their associated slots 106 in the rear side of the base housing 12 (see FIG. 4) and thereby free the auxiliary housing 50 from the base housing 12.

With the auxiliary housing 50 operatively attached to the underside of the base housing 12, the overall functionality of the computer 10 is enhanced by the addition of the media devices 88,90 to the overall computer system. Moreover, as previously described, the presence of the generally wedge-shaped auxiliary housing 50 in an underlying relationship with the base housing 12 automatically provides the comfortable slope angle A for the keyboard 28 while at the same time providing the computer with a stable base on the desktop 52, with the computer 10 contacting the desktop 52 at the various previously described resilient support projections 96,98,108.

Not only does the generally wedge-shaped auxiliary component housing 50 provide the computer 10 with these operational advantages, but it serves several aesthetic functions as well. For example, due to its thin, generally wedge-shaped configuration, and the fact that it extends along only a rear underside portion of the base housing 12, the auxiliary housing 50 is visually less obtrusive than conventional component housings that are removably attachable to the a notebook computer base housing, and serves to highlight the desirable vertical thinness of the base housing 12.

This aesthetic enhancement provided by the uniquely configured auxiliary housing 50 is bolstered by the truncated wedge shape of its front edge section and the cutout area 92 formed on a rear underside portion of the housing 50—each of which tends to reduce the visual thickening of the computer due to the presence of the auxiliary housing 50. This visual effect is even further augmented by dimensioning the auxiliary housing 50 in a manner such that its left-to-right length is just slightly shorter than the left-to-right length of the base housing 12. Accordingly, as may be best seen in FIG. 4, the opposite ends 68,70 of the attached auxiliary housing 50 are slightly inset from the left and right ends 24,26 of the base housing 12, thereby tending to visually emphasize the vertical thinness of the base housing 12 as opposed to the additional vertical computer thickness created by the presence of the attached housing 50.

The easily attachable and removable wedge-shaped auxiliary housing 50 permits the computer user to choose between an ultra-thin basic portable computer (with the housing 50 removed) or an increased functionality portable computer (with the housing 50 attached) having only somewhat more bulk and weight. With the housing 50 attached, the computer 10 may be provided with even greater functionality by simply placing the computer atop a suitable docking station (not shown) in a manner releasably coupling the connector 100 on the bottom side 62 of the auxiliary housing with a corresponding upwardly facing electrical connector on the docking station.

The foregoing detailed description is to be clearly understood as being given by way of illustration and example only, the spirit and scope of the present invention being limited solely by the appended claims.

What is claimed is:

1. A portable computer interface, comprising:
   a top portion adapted to matingly engage a bottom of a portable computer;
   a first electrical connector disposed on the top portion, the first electrical connector being adapted for connection to a second electrical connector disposed on the bottom of the portable computer, and
   a bottom portion adapted to support the portable computer on a planar surface,
   wherein the top and bottom portions permit a front bottom region of the portable computer to contact the planar surface such that the portable computer is oriented at an angle relative to the planar surface.

2. The portable computer interface as recited in claim 1, comprising a first securing member disposed on the top portion, the first securing member being adapted to cooperate with a second securing member disposed on the bottom portion of the portable computer to releasably secure the portable computer and portable computer interface.

3. The portable computer interface as recited in claim 2, wherein the first securing member is spring-loaded to automatically engage the second securing member when the top portion is abutted against the portable computer.

4. The portable computer interface as recited in claim 2, comprising a securing member release operable to disengage the first and second securing members.

5. The portable computer interface as recited in claim 1, wherein the top and bottom portions are adapted to angle the portable computer at an angle from 8.5 degrees to 9.5 degrees relative to the planar surface.

6. The portable computer interface as recited in claim 1, comprising a third electrical connector disposed on a rear portion of the portable computer interface, wherein the third electrical connector is electrically coupled to the second electrical connector by the first electrical connector.

7. The portable computer interface as recited in claim 1, comprising a media storage device operable to transfer data between the media storage device and a storage media disposed within the media storage device.

8. The portable computer interface as recited in claim 4, wherein the securing member release is disposed on a side of the portable computer interface.

9. A portable computer interface, comprising:
   means for securing a portable computer interface having a first electrical connector disposed on a top portion of the portable computer interface to a portable computer having a second electrical connector disposed on a bottom portion of the portable computer; and
   means for positioning the portable computer at an angle when the bottom of the portable computer interface is disposed on a support surface.

10. The portable computer interface as recited in claim 9, comprising means for aligning the top portion of the portable computer interface with the bottom portion of the portable computer.

11. The portable computer interface as recited in claim 10, comprising means for accessing a plurality of electrical connectors disposed on a rear side of the portable computer when the portable computer interface is secured to the portable computer.

12. A method of manufacturing a portable computer interface, comprising:
    forming a portable computer interface housing to receive a first electrical connector disposed on a top portion of the portable computer interface housing; and
    forming the portable computer interface housing with an angled spatial envelope to enable the portable computer interface housing to support the portable computer at an angle relative to a supporting surface when the portable computer interface is disposed on the supporting surface.

13. The method as recited in claim 12, comprising installing the first electrical connector within the portable computer interface housing.

14. A method of manufacturing, comprising:
    providing a docking base having an angled spatial envelope and an electrical docking connector portion disposed on a top portion of the angled spatial envelope, which is adapted to support a portable computer at an angle relative to a supporting surface for the docking base and for the portable computer.

15. The method as recited in claim 14, wherein providing the docking base comprises forming the angled spatial envelope.

16. The method as recited in claim 14, wherein providing the docking base comprises mounting an electrical docking connector at the electrical docking connector portion.

17. The method as recited in claim 14, wherein providing the docking base comprises assembling electronics in the angled spatial envelope.

18. The method as recited in claim 14, comprising providing the portable computer with a mating electrical connector disposed on a bottom portion of the portable computer.

* * * * *